Patented May 5, 1936

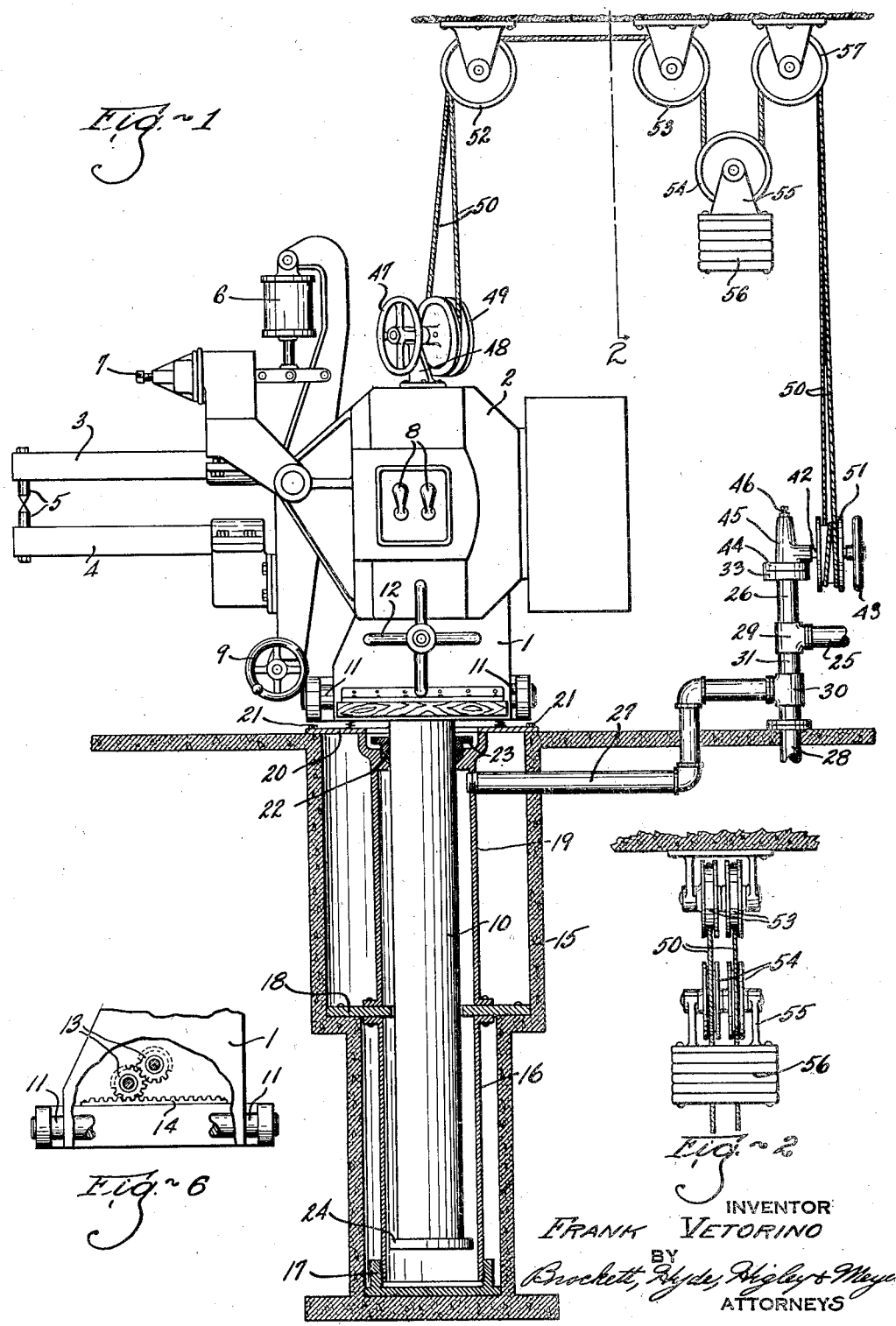

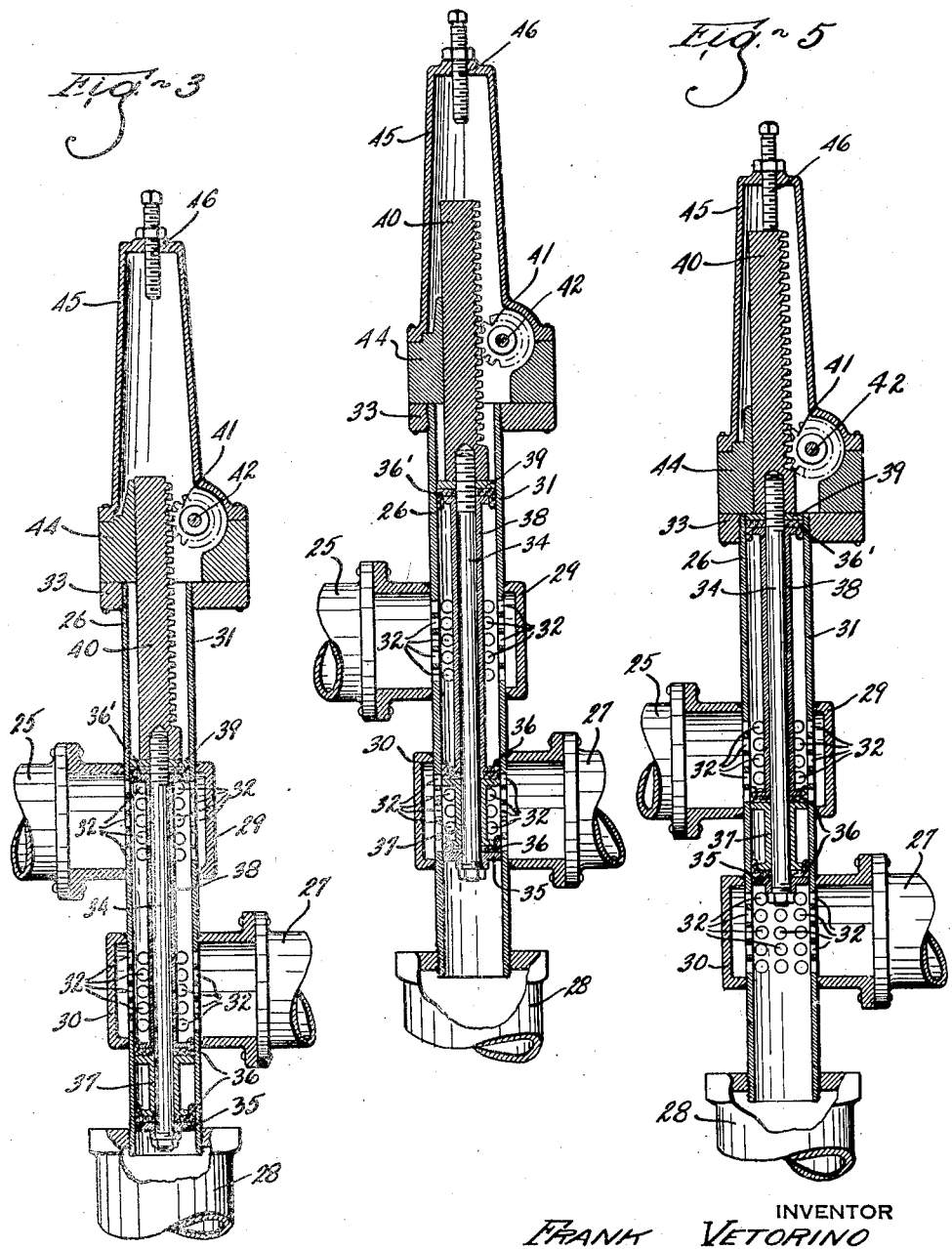

2,039,858

UNITED STATES PATENT OFFICE 2,039,858

SPOT WELDING APPARATUS

Frank Vetorino, Cincinnati, Ohio, assignor to The American Laundry Machinery Company, Cincinnati, Ohio, a corporation of Ohio Application September 19, 1932, Serial No. 633,713

5 Claims. (Cl. 219—4)

My invention relates to a spot welding apparatus and, particularly, to a raising and lowering mechanism for a spot welding apparatus of the type disclosed in my copending application Serial No. 633,313, filed September 15, 1932 wherein an electrode and transformer carrying frame is vertically, rotatably, horizontally adjustable on a support.

It is the object of my invention to provide a hydraulic raising and lowering mechanism for the electrode and transformer supporting frame of the previously mentioned application while, at the same time, providing for the horizontal movement of the frame and a means whereby movement of the frame upwardly and downwardly by the hydraulic mechanism will be at a slow and even rate. Such slow and even movement is provided for by the novel construction of the fluid supply and exhaust arrangement of the hydraulic mechanism.

Another object of my invention is to provide a hydraulic raising and lowering mechanism for spot welding apparatus as before mentioned with means provided for controlling the operation of the hydraulic mechanism from a point in proximity to the arrangement of the apparatus controls on the electrode and transformer carrying frame, the hydraulic raising and lowering mechanism being, of necessity, apart therefrom.

Various other objects and advantageous features of my invention will be seen in the following description and one embodiment thereof may be seen in the accompanying drawings wherein similar characters of reference designate corresponding parts, and wherein:

Fig. 1 is a side view, partly in section and partly in elevation, showing the hydraulic raising and lowering mechanism and the general arrangement of the parts of the apparatus;

Fig. 2 is a fragmentary view taken on the line 2—2 of Fig. 1;

Fig. 3 is a sectional view of the hydraulic raising and lowering mechanism operating valve showing the valve in a position to admit piston actuating fluid to the cylinder;

Fig. 4 is a view similar to Fig. 3, but showing the valve in a position to cut off both fluid flow and exhaust to and from the cylinder to thereby maintain the piston in the desired position;

Fig. 5 is a view similar to Figs. 3 and 4, but showing the valve in a position which will permit fluid to exhaust from the cylinder and thereby lowering of the piston and electrode and transformer carrying frame; and Fig. 6 is a view showing the mechanism for moving the welding electrode and transformer carrying frame horizontally and transversely of the raising and lowering mechanism.

The operative welding parts of the machine shown in the drawings, for the purpose of illustration, are shown as being identical with those disclosed in the hereinbefore mentioned copending application, and comprise a frame 1 carrying a transformer 2 and welding electrode arms 3 and 4 which, in turn, support welding electrodes 5. Likewise, a moving and pressure producing mechanism 6 for the upper electrode arm 3 is provided, as well as a pressure adjusting means 7. Suitable controls 8 for the welding operation are likewise provided and the lower welding electrode arm 4 includes features of adjustability, for example, vertical adjustability by means of a hand wheel 9 and suitable mechanism, not shown.

In accordance with my invention, the frame 1 is carried by a fluid operated piston 10 operating in a suitable cylinder. As shown in Figs. 1 and 6, the frame 1 is slidably mounted on horizontally disposed shafts 11 that are carried by the uppermost end of the piston 10, the frame 1 being thereby slidably adjustable transversely of the vertically extending piston. The means for moving the frame 1 horizontally along the shafts 11 includes a hand wheel 12 carried by the frame 1 and adapted to actuate gears 13 also carried by the frame, one of these gears 13 meshing with a rack 14 that is rigidly mounted on top of the piston 10. Thus, rotation of the hand wheel 12 and gears 13 will result in horizontal sliding movement of the frame 1 along the shafts 11 and transversely of the vertically extending piston 10. The frame 1 may be rotated about its vertical axis by turning it manually, the piston 10 rotating in the cylinder sleeves 16 and 19.

Referring to Fig. 1, the piston 10 operates in a cylinder disposed in a suitable pit 15, the cylinder consisting of the lower sleeve 16 threaded into the cap 17 at the bottom of the pit 15 and rigidly connected at its upper end to a stop or dividing plate 18. An upper sleeve 19 has one of its ends connected to the stop or dividing plate 18 and connected its upper end to a circular cover plate 20 which is secured to a floor or other support by means of screws or bolts 21. It will be noted that the uppermost end of the upper sleeve 19 is provided with a packing gland including packing 22 and a packing ring 23 through which the piston 10 extends upwardly. Also, it will be noted that the lowermost end of the piston 10 has a shoulder portion 24 for a purpose hereinafter apparent.

Fluid under pressure is supplied to or exhausted from the cylinder containing piston 10 through a fluid inlet pipe 25, an inlet and exhaust control valve 26 and a pipe 27, fluid exhausting from the cylinder through the pipe 27, valve 26 and exhaust pipe 28. Special pipe fittings 29 and 30 are provided as shown in Figs. 3, 4 and 5 assembled with the fluid inlet pipes 25, 27 and the fluid inlet and exhaust pipes 27, 28. With these fittings, a cylinder sleeve 31 which likewise forms a part of the control valve as will be hereinafter described extends therethrough at a point approximately midway in the body portions of the fittings and the cylinder sleeve within these fittings is provided with a plurality of ports 32 through which fluid flowing into and exhausting from the cylinder 16 must pass from the pipes 25 and 27 either to the cylinder or to exhaust. These ports are provided to decrease the velocity of the fluid entering or flowing out of the cylinder to thereby cause a smooth regular course in the elevation or lowering of the piston 10 and the frame 1.

The means for controlling the flow and exhaust of fluid to the cylinder 16 consists of the cylinder sleeve 31 which has both of its ends threaded, one threaded end being assembled with the exhaust fluid outlet 28 and the other assembled with a top ring 33. A piston type valve which consists of a rod 34, a disk 35, a pair of washers 36 of flexible material, and a washer separator or spacer 37 is arranged to move upwardly and downwardly in the cylinder sleeve 31 to close off the ports permitting passage of fluid from the sleeve 31 to the pipe 27 or vice versa. On the upper end of the rod 34 I provide a cylinder sleeve sealing means consisting of a flexible washer 36' that is spaced from the top one of the lower piston washers 36 by a sleeve 38 which is provided with a collar portion at each end that seats in recessed portions of the flexible washer for retaining the stiffness and rigidity of the washers when in operation. A disk 39 is provided to prevent distortion of the washer 36' during operation of the valve.

To move the valve to its various operating positions as shown in Figs. 3, 4 and 5, the upper end of the piston rod 34 is threaded into a rack bar 40 which travels upwardly and downwardly in the sleeve 31 and this rack bar and the valve operated thereby is adapted to be moved upwardly and downwardly by a gear 41 meshing with the teeth of the rack bar 40, the gear being rotated by rotating the shaft 42 on which it is mounted by a hand wheel 43. A rack bar support and guiding member 44 maintains the rack bar in meshing relation with the gear 41 and the rack bar is enclosed by a housing 45 that also has a screw bolt 46 therein which may be adjusted to limit the degree of upward movement of the rack bar and valve.

In the functioning and operation of the control valve just described, assuming that it is desired to elevate the frame 1 from the position shown in Fig. 1 to some desired height, the hand wheel 43, and gear 41 are rotated contra-clockwise to lower the rack bar 40 and the piston carried thereby. As shown in Fig. 3, the piston is lowered until the ports leading from the sleeve 31 to the pipe 27 are uncovered whereby fluid may flow from the inlet pipe 25, through the ports 32 in the fixture 29, through the sleeve 31, through the ports 32 in the fixture 30, and through the pipe 27 to the cylinder 16, that inlet of fluid to the cylinder 16 will be effective to raise the piston 10 and the frame 1 carried thereby.

After the frame 1 has been elevated to the desired height, the hand wheel 43 and gear 41 are rotated clockwise to raise the rack bar 40 and piston carried thereby, this raising movement continuing until the piston assumes the position shown in Fig. 4 wherein it effectually closes off the flow of fluid through the ports 32 in the fixture 30 and thence to the pipe 27. Likewise, the position of the piston is such as to prevent exhaust of the fluid in the cylinder 16 through the ports 32 in the fixture 30 to the fluid exhaust pipe 28. Thus, the piston 10 and frame 1 will be maintained in their elevated position. Then, when it is desired to lower the frame 1 and piston 10, the hand wheel 43 and gear 41 are further rotated clockwise to move the piston still further upwardly to the position shown in Fig. 5 wherein it permits flow of fluid from the cylinder 16 through the pipe 27, ports 32 in the fixture 30, and sleeve 31 into the fluid exhaust pipe 28. At the same time, the piston is in such position as to close off flow of fluid from the inlet pipe 25 to the pipe 27 through the sleeve 31.

Means have been provided for operating the control valve 26 from a point adjacent the welding operation control members 8 on the frame 1 whereby all of the operations of the apparatus may be controlled without necessitating the operator moving from one point to another, and this means consists of a hand wheel 47 carried by a bracket 48 at the top of the frame 1 and arranged to operate a sheave wheel 49, an endless cable 50 being wound around and connecting the sheave wheel 49 with the sheave wheel 51 about which the cable is likewise wound. The sheave wheel is mounted on the shaft 42 through which the gear 41 is operated. In connecting the sheave wheel 49 with the sheave wheel 51 by the endless cable 50, such cable first extends upwardly and around sheave wheels 52 that are in substantial vertical alignment with the sheave wheel 49 in order to permit rotation or oscillation of the frame 1 about its vertical axis without pulling the cable 50 from the sheave wheels. From the sheave wheels 52, the cable 50 passes horizontally to and around sheave wheels 53 likewise disposed above the sheave wheel 49, downwardly and around sheave wheels 54 mounted in bracket 55 on the counterweight 56, and thence upwardly and around sheave wheels 57 to finally extend downwardly to and be wound around the sheave wheel 51 on the shaft 42, the counterweight 56 being provided to maintain a tension on the cable 50 at all times by taking up slack in the cable caused by elevating the frame 1 in the manner hereinbefore described and to provide sufficient cable to permit lowering of the frame 1 from an elevated position. With this construction, rotation of the hand wheel 47 will result in rotation of the sheave wheel 51, shaft 42, and gear 41 to raise and lower the piston valve as will be readily apparent.

Referring to the drawings and the preceding description, I have provided a hydraulic elevating and lowering means for a spot welding apparatus, as well as having provided for horizontal movement of the apparatus including the electrodes and rotation thereof about its vertical axis. Likewise, I have provided a means for causing a smooth and even elevating and lowering movement of the spot welding apparatus which takes the form of a means in the fluid supply and exhaust lines for lowering the velocity of fluid supplied to the hydraulic mechanism or exhausted therefrom for raising and lowering the spot welding apparatus. Further, I have provided means for operating the fluid supply and exhaust control valve of a hydraulic mechanism that, in this instance, is most conveniently spaced from the spot welding electrode carrying frame, from a point in proximity to the remainder of the spot welding apparatus operating controls whereby the entire operation of the apparatus may be controlled from one point without necessitating operator movement from one point to another.

What I claim is:

1. Spot welding apparatus comprising a frame, welding electrodes carried on one side of said frame, control members for said electrodes on said frame, a vertically disposed cylinder, a piston reciprocable therein, said piston being rotatable about its longitudinal axis, said frame being mounted on the upper end of said piston and rotatable therewith to position said electrodes at various points about said piston, fluid supply means for operating said piston in said cylinder, and control means for said supply means grouped with said control members.

2. Spot welding apparatus comprising a frame, welding electrodes carried on one side of said frame, control members for said electrodes on said frame, a vertically disposed cylinder, a piston reciprocable therein, said piston being rotatable about its longitudinal axis, said frame being mounted on the upper end of said piston and rotatable therewith to position said electrodes at various points about said piston, means for moving said frame transversely of said piston, a control member for said frame moving means, fluid supply means for operating said piston in said cylinder, a control member for said supply means, and all of said control members being grouped together on said frame.

3. Spot welding apparatus comprising a frame member, welding electrodes carried on one side of said frame member, control means for said electrodes on said frame member, a vertically disposed cylinder, a piston member reciprocable therein, said frame member being mounted on the upper end of said piston member, one of said members being rotatable about a vertical axis to position said electrodes at various points about said piston member, fluid supply means for operating said piston member in said cylinder, and control means for said supply means grouped with said first named control means.

4. Spot welding apparatus comprising a frame member, welding electrodes carried on one side of said frame member, control means for said electrodes on said frame member, a vertically disposed cylinder, a piston member reciprocable therein, said frame member being mounted on the upper end of said piston member, one of said members being rotatable about a vertical axis to position said electrodes at any point radially about said piston member, and fluid supply means for operating said piston member in said cylinder.

5. Spot welding apparatus comprising a frame, welding electrodes carried on one side of said frame, control members for said electrodes on said frame, a vertically disposed cylinder, a piston reciprocable therein, said piston being rotatable about its longitudinal axis, said frame being mounted on the upper end of said piston and rotatable therewith to position said electrodes at any point radially about said piston, and fluid supply means for operating said piston in said cylinder.

FRANK VETORINO.